Figure 1:
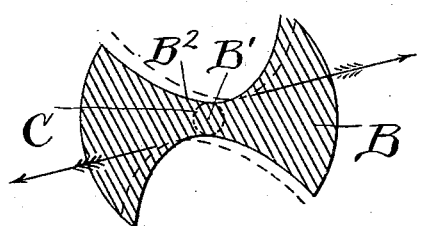

E. C. PECK.
PROCESS OF MAKING TWIST DRILLS.
APPLICATION FILED APR. 9, 1906.

968,400.

Patented Aug. 23, 1910.

Witnesses.
E. B. Gilchrist.
H. B. Sullivan

Inventor.
Eugene C. Peck
by
Thurston Woodward
attys

UNITED STATES PATENT OFFICE.

EUGENE C. PECK, OF CLEVELAND, OHIO, ASSIGNOR TO THE CLEVELAND TWIST DRILL CO., OF CLEVELAND, OHIO, A CORPORATION OF OHIO.

PROCESS OF MAKING TWIST-DRILLS.

968,400.  Specification of Letters Patent.  Patented Aug. 23, 1910.

Application filed April 9, 1906. Serial No. 310,610.

*To all whom it may concern:*

Be it known that I, EUGENE C. PECK, a citizen of the United States, residing at Cleveland, in the county of Cuyahoga and State of Ohio, have invented a certain new and useful Improvement in Processes of Making Twist-Drills, of which the following is a full, clear, and exact description.

It is the object of the present invention to so manipulate the milling cutters in the manufacture of twist drills as to produce a drill having a web increasing in thickness from the point toward the shank and a cutting lip and chip space substantially constant and uniform throughout the length of the drill. Heretofore, in this art, since the practice of making drills with an increase of thickness in the web has been followed, the method of attaining such increase has been to withdraw the milling cutter away from the axis of the blank substantially along a line parallel to the plane of rotation of the cutter. Such a method of manipulating the cutter obviously results in its being withdrawn from the blank to such an extent as to materially increase the shallowness of the groove and consequently diminish the chip area, which has been regarded as a matter of serious consideration in connection with these drills. As is well known to those skilled in the art, a method of attempting to prevent such a diminution of the chip area has been to give a skew cut to the groove, which may be accomplished either by changing the angle between the plane of rotation of the cutter and the axis of the blank, or by alteration of the rate of feed of the blank to the cutter, the rate of rotation being constant. Now, while this skew cut relieves the situation so far as the chip space is concerned, it so alters the contour of the groove that the cutting lip will not maintain the character of a straight line which it has at the point, but will become shorter and more hooked as the shank is approached and the skew cut increases. I have, however, discovered a method of manipulating the milling cutters in a manner whereby the thickness of the web of the drill may be increased from the point toward the shank without any substantial diminution in the chip space and without an undesirable departure from the straight line of the cutting lip.

In general, it may be said that my process consists in withdrawing a cutter from the axis of the blank along a line, either curved or straight, toward the back wall of the groove, which line shall be at a decided angle to the plane of rotation of the cutter. The effect of such manipulation is that the resultant of movement has a component in a radial direction away from the axis of the blank with the object of thickening the web, and another component in a direction such that the side of the cutter which has the shorter radius and which shapes the back wall of the groove advances somewhat full face into the metal of the blank, while the side of longer radius, which shapes the cutting lip, will leave the metal behind it more nearly tangentially, with respect to its curve, and without the abruptness with which the advancing side enters it.

Figure 4:
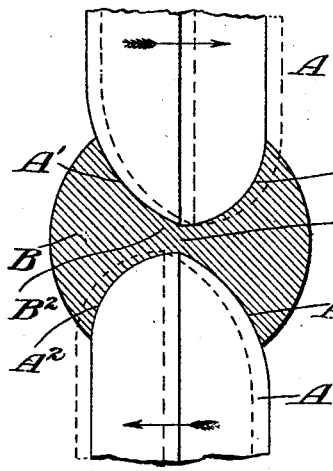
Figure 2:
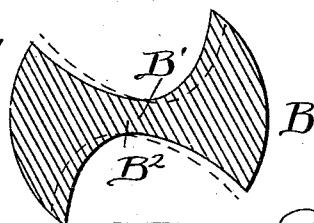
Figure 3:
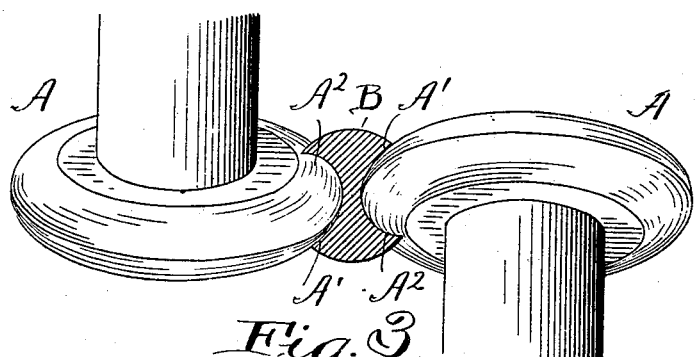

Referring to the accompanying drawings which serve to illustrate the method of manipulation which I have invented, Figure 1 illustrates the direction of movement, and effect of the movement, of the milling cutter in my preferred practice. Fig. 2 illustrates a direction of movement, and effect of movement, which may be adopted in certain instances. Fig. 3 is a diagram illustrating the approximate position of cutters set at the proper angle to mill a twist drill, the drill being shown in transverse cross section as seen from the shank looking toward the point. Fig. 4 is a diagram illustrating the effect of movement of milling cutters in a direction exactly at right angles to the plane of rotation, the plane of rotation being in this figure arbitrarily selected as parallel with the axis of the blank.

Referring to Fig. 4 in which the diagram is drawn as if the milling cutters A rotated in planes parallel with the axis B′ of the blank, B, it will be obvious that a movement of the cutters away from the axis of the blank in the direction of the arrows, along a line at right angles to the plane of rotation, will have the effect, as shown by the dotted lines, of shifting the innermost portion of the groove away from the axis, thus thickening the web, $B^2$. Referring now to Fig. 2 in which the diagram is drawn to illustrate the curve of the groove cut when the cutters are in the proper milling position as shown in Fig. 3, it will be seen that the same movement will thicken the web. It will further be seen that although the rearward portion, A' Fig. 3 or that face of the cutter having the larger radius of curvature, will leave metal behind it as it advances, thus tending to fill up the groove and to cause it to become shallower, nevertheless, the advancing side, or heel, $A^2$, will bite deeply into the metal to a sufficient extent to substantially compensate for the filling of the groove behind the cutter. An inspection of this figure will show that the advancing side of the cutter moves into the metal full face on, while the retreating side of the cutter moves more nearly tangentially with respect to its own curve, and therefore, though of greater length than the advancing side, does not leave behind it practically any more metal than is milled off by the advancing side. Therefore, it will be readily understood that although the innermost portion of the groove is farther from the axis of the blank, nevertheless the chip space may be maintained practically constant, through the peculiar movement above noted. Now, this effect may be obtained without any alteration in the character of the groove, such as to cause the cutting lip to depart from the straight line which it has when the drill is properly pointed and given clearance, inasmuch as the angle of the cutter need not be changed with respect to the axis of the blank, or the path of the helix. Further, the movement of a cutter away from the axis of a blank for the purpose of thickening the web, may be along any line, straight or curved, within the following limitations:—First, the direction of movement must be at an angle to the plane of rotation and toward the back wall of the groove in order that the heel of the cutter shall advance into the metal, this advance being necessary in order to maintain the proper chip space, notwithstanding the movement of the cutter, as a whole, away from the axis of the blank. Second, the line of movement must be such that the innermost portion of the cutter, that is to say, that portion of the cutter nearest to the axis of the blank, shall not move along, or pass within, the circle, C, which is concentric with the axis of the blank and tangent to that portion of the groove which is nearest the axis during the preceding period of cutting. This is obviously necessary, since any movement which would cause the innermost portion of the cutter to pass within this circle, would be causing the groove to approach the axis of the blank, and therefore, result in thinning the web rather than thickening it; while a movement causing the innermost part of the cutter to move along such a circle, would simply maintain an even thickness of the web throughout.

While in the main, I find that the direction of movement indicated in Fig. 1 of the drawing is to be preferred, I wish to clearly point out that the scope of my invention is considerably broader than movement in a single direction and is limited only as above indicated.

Having thus described my invention, I claim:

1. A method of making twist drills which comprises moving the rotary cutter away from the axis of the blank along a line toward the back wall of the groove at an angle to the plane of rotation of the cutter.

2. A method of making twist drills which comprises moving the cutter away from the axis of the blank and simultaneously causing the side of the cutter having the shorter radius to advance into the metal to a substantial amount.

3. A method of making twist drills which comprises maintaining a practically constant angle between the axis of the blank and the plane of rotation of the rotary cutter and moving the cutter away from the said axis along a line toward the back wall of the groove at an angle to the said plane of rotation.

4. A method of making twist drills which comprises maintaining a practically constant angle between the axis of the blank and the plane of rotation of the cutter, moving the cutter away from the axis of the blank and simultaneously causing the side of the cutter having the shorter radius to advance into the metal to a substantial extent.

5. A method of making twist drills which comprises moving the portion of the cutter which is at the point nearest to the axis of the blank away from said axis along a line lying between the plane of rotation of the cutter and a circle concentric with the blank and also passing through that point.

6. A method of making twist drills which comprises maintaining a practically constant angle between the axis of the blank and the plane of rotation of the cutter and moving the cutter so that the portion of its circumference nearest the axis of the blank will move away from said axis along a line at an angle to the said plane of rotation.

7. A method of making twist drills which comprises maintaining a practically constant angle between the axis of the blank and the plane of rotation of the cutter and moving that portion of the cutter at the point nearest the axis of the blank away from said axis along a line lying between said plane of rotation and a circle concentric with the blank and also passing through said point.

In testimony whereof, I hereunto affix my signature in the presence of two witnesses.

EUGENE C. PECK.

Witnesses:
J. M. WOODWARD,
GEO. F. KAST.